United States Patent [19]

Villata et al.

[11] Patent Number: 5,687,825
[45] Date of Patent: Nov. 18, 1997

[54] CLUTCH MECHANISM, NOTABLY FOR A MOTOR VEHICLE

[75] Inventors: Gino Villata, Buttigliera D'Asti, Italy; Jean-Pierre Giroire, St. Germain En Laye, France

[73] Assignee: Valeo, Paris, France

[21] Appl. No.: 553,537

[22] PCT Filed: Mar. 29, 1995

[86] PCT No.: PCT/FR95/00390

§ 371 Date: Nov. 30, 1995

§ 102(e) Date: Nov. 30, 1995

[87] PCT Pub. No.: WO95/27154

PCT Pub. Date: Oct. 12, 1995

[30] Foreign Application Priority Data

Mar. 30, 1994 [FR] France ................. 94 03748

[51] Int. Cl.⁶ .................................................. F16D 13/44
[52] U.S. Cl. .............................. 192/89.23; 192/70.27
[58] Field of Search ..................... 192/89.23, 89.24, 192/89.25, 70.27

[56] References Cited

U.S. PATENT DOCUMENTS

| 3,939,951 | 2/1976 | Sink et al. . | |
| 4,491,211 | 1/1985 | Steeg ............................ | 192/89.23 |

FOREIGN PATENT DOCUMENTS

| 1524350 | 9/1968 | France . | |
| 2385944 | 10/1978 | France . | |
| 2546999 | 12/1984 | France ...................... | 192/89.23 |
| 2547000 | 12/1984 | France ...................... | 192/89.23 |
| 2548301 | 1/1985 | France . | |
| 2044866 | 10/1980 | United Kingdom . | |
| 2165321 | 4/1986 | United Kingdom . | |
| 2177466 | 1/1987 | United Kingdom . | |

*Primary Examiner*—Andrea L. Pitts
*Attorney, Agent, or Firm*—Longacre & White

[57] ABSTRACT

A clutch mechanism including a cover, a diaphragm, a pressure plate and studs for mounting the diaphragm on the cover. The studs have a guide portion with flats for cooperating with lateral edges of orifices formed in the diaphragm. Such an arrangement reduces wear on the guide portions.

7 Claims, 5 Drawing Sheets

CLUTCH MECHANISM, NOTABLY FOR A MOTOR VEHICLE

BACKGROUND OF THE INVENTION

The present invention concerns the diaphragm clutch mechanisms as described for example in the document FR-A-1 524 350.

Such a mechanism forms a unit assembly and includes a cover suitable for being attached to the reaction plate of the clutch, a diaphragm mounted on the cover by pivoting means pivotally fixing the diaphragm to the cover, a pressure plate fixed to the cover with respect to rotation whilst being mounted so as to be axially movable with respect to it using coupling means, such as tangential elastic tongues.

In this type of mechanism the diaphragm bears on the cover in order to act on the pressure plate so as to push it away from the cover.

More precisely, the pivoting means include studs fixed to the cover and having a head profiled so as to offer a support for the peripheral part, in the form of a Belleville washer, of the diaphragm.

The studs pass through broadened orifices 23 (FIG. 5) formed in the area where the fingers 22 of the diaphragm are rooted at the Belleville washer part 21 of the latter.

These orifices are said to be broadened since they form one of the ends of the slots 24 separating the fingers 22 in pairs.

These orifices have a rectangular shape overall with lateral edges 25 designed to cooperate with an annular-shaped guide portion, in this case cylindrical, which the stud has between its head and foot.

In practice it has been found that wear phenomena occur at this guide portion. This is due to the fact that the diaphragm is a hardened piece.

The object of the present invention is to mitigate this drawback.

SUMMARY OF THE INVENTION

According to the invention a mechanism of the type indicated above is characterised in that its guide portion is cut into to form two lateral edges overall in the form of flats designed to cooperate with the lateral edges of the broadened orifices of the diaphragm.

Thus the wear on the said guide portions is reduced by increasing the contact surfaces, to the benefit of better functioning of the diaphragm because these lateral edges have a height greater than the thickness of the diaphragm.

The mechanism therefore has better reliability, its service life being increased.

It will be noted that the edges are overall in the form of flats since they can be slightly convex, notably when the studs are produced by forging. The lateral edges are therefore parallel to each other overall.

These studs are hardened, for example by a quench-hardening and annealing operation.

As a variant the studs can be in two parts, namely a first part fulfilling the functions of pivoting and guiding the diaphragm and a second part, in the form of a rivet, passing through the first part to fix the stud to the base of the cover.

This arrangement is particularly advantageous since the first part can easily be hardened, being for example produced from sintered steel, whilst the second part is produced by means of a standard unhardened rivet allowing easy fixing of the studs.

This second part supports only tensile loads.

The rivet can thus have a smaller cross section than when the stud is made in a single piece.

This rivet is also long, which makes it possible to achieve clamping of the diaphragm of the elastic type between its tilt supports, which is useful for reducing parasitic friction of the diaphragm pivot to a minimum.

In addition it is possible to reduce the size of the stud in its lower part, which is particularly advantageous, space being left for the friction disc.

The invention will be more clearly understood on a reading of the detailed description of the preferred embodiment of the invention which follows, and which is given by way of example only and with reference to the accompanying drawings.

DETAILED DESCRIPTION OF THE PREFERRED EMBODIMENT

In these figures a diaphragm clutch mechanism is illustrated, intended for fitting to a motor vehicle.

This mechanism forms a unit assembly and includes annular parts, namely a cover 1, in this case made from pressed sheet metal, a pressure plate 3, usually cast iron, and a diaphragm 2.

It also includes tangential elastic tongues 8, fixing components 35, 85 and return hooks 5 described below.

Figure 2:
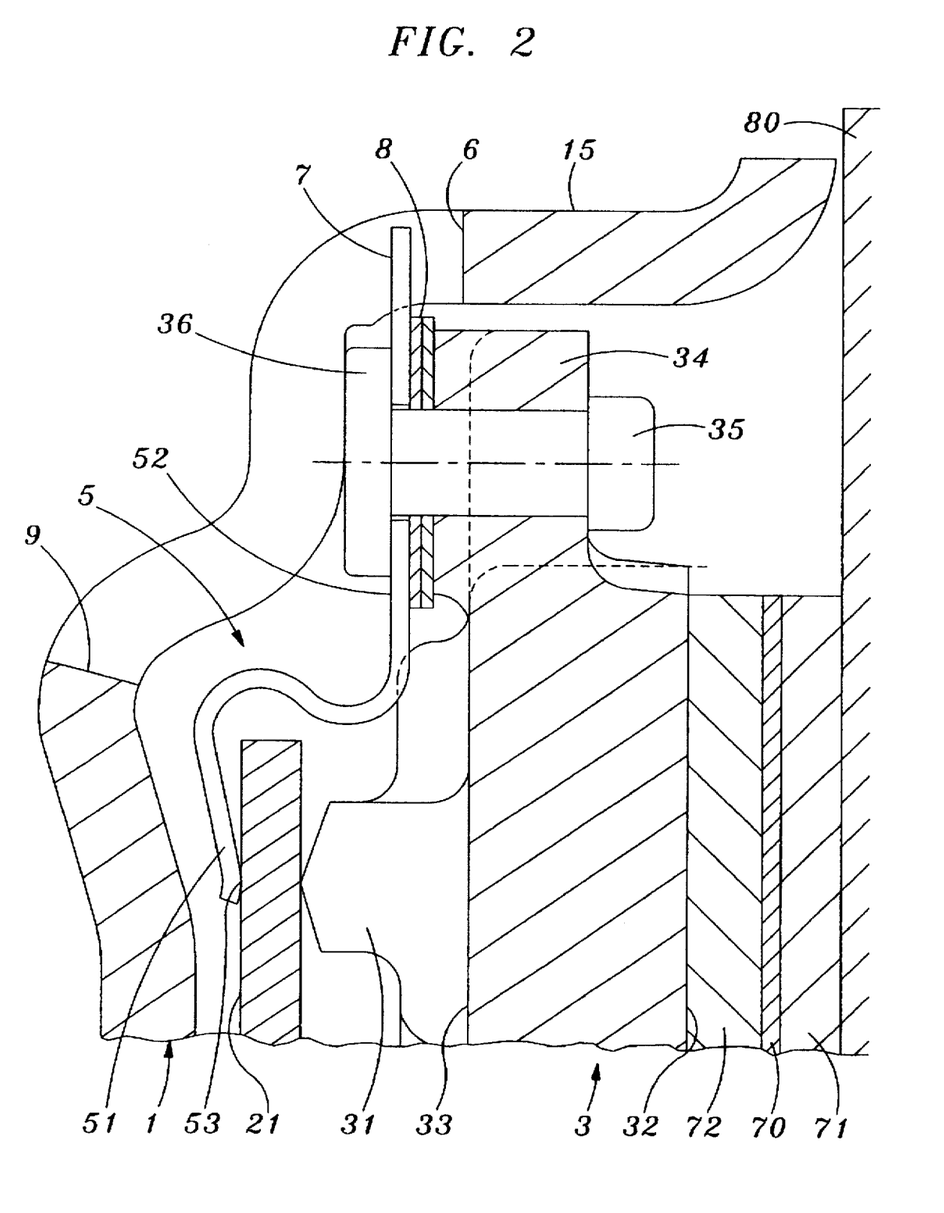
FIG. 2 is a partial view, to a larger scale, of a part of the mechanism in the top part of FIG. 1.

This mechanism is designed to be attached by its cover 1, in this case in the form of a hollow dish with a base 11 with a central hole, to a reaction plate 80 (FIGS. 2 and 10) with the interposition of a friction disc 70 (FIGS. 2 and 10) fixedly carrying friction linings 72, 71, optionally in sections, mounted on each side thereof.

The reaction plate, optionally in two parts, is designed to be fixed with respect to rotation to the crankshaft of the vehicle engine, whilst the disc 70 is designed to be fixed with respect to rotation, by means of a hub 73 (FIG. 10), to the gearbox input shaft.

The diaphragm 2 is mounted on the cover 1 by pivoting means 4 pivotally fixing the diaphragm 2 to the cover 1.

The pressure plate 3 is fixed with respect to rotation to the cover 1 whilst being mounted so as to be axially movable with respect thereto, in a manner known per se, by coupling means in this case in the form of tangential elastic tongues 8.

As a variant it is possible to use a connection of the mortice and tenon type, the pressure plate 3 carrying tenons, in the form of lugs, engaged in mortices, in the form of slots, provided in the skirt 12 of the cover, described below.

Return hooks 5 are provided to couple the diaphragm 2 to the pressure plate 3 by gripping the outer periphery of the diaphragm 2, in the form of a Belleville washer 21, between the said hooks 5 and a support boss 31, which the pressure plate 3 has at its outer periphery for supporting the diaphragm 2.

Fixing components 35 are provided for fixing the tongues 8, in this case metallic, and the return hooks 5, also metallic, to lugs 34, which the pressure plate 3 has radially projecting at its outer periphery.

More precisely the cover 1 has, in addition to the aforesaid base 11, a radial flange 13 for fixing it to the reaction plate 80, and an annular skirt 12, with a principal part of axial orientation overall, connecting the fixing flange 13 to the base 11.

This flange 13 is divided into fixing areas (FIG. 3), which have holes 14 for mounting fixing components (not visible), such as screws or rivets, for fixing the cover 1 and the mechanism to the plate 80.

The base 11 of the cover 1 carries a plurality of studs 41 having a head 42 (FIG. 6), 142 (FIGS. 10 and 11) and carrying an annular ring 43.

The diaphragm 2 (FIG. 5) has, in addition to its peripheral part 21, a central part divided into radial fingers 22 by slots 24 broadening out at the area where the fingers 22 are rooted in the Belleville washer 21 to form broadened orifices 23 through which the central shaft of the studs 41 passes.

Figure 5:
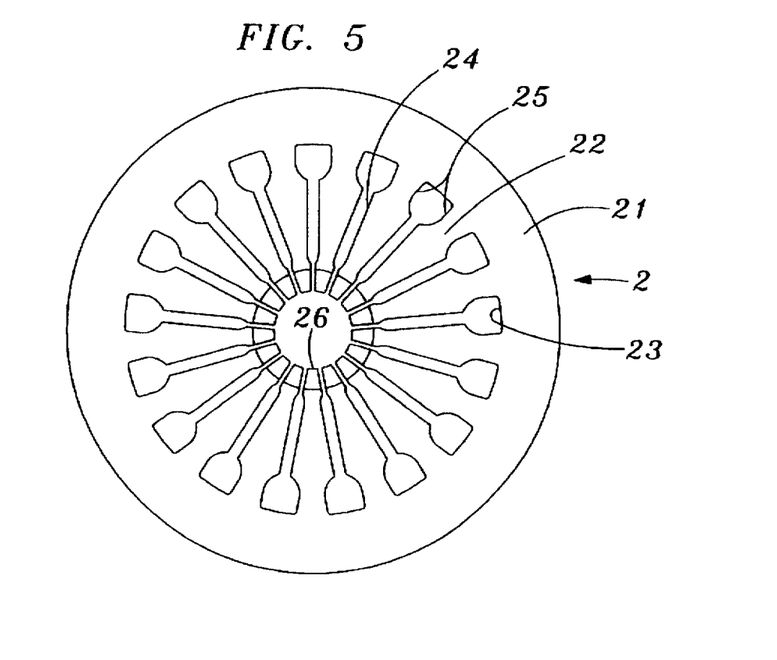
FIG. 5 is a plan view of a diaphragm.

The slots 24 therefore open out at one of their ends into the broadened orifices 23, formed at the inner periphery of the Belleville washer 21, and at the other end into a central opening 26, which the diaphragm has centrally, for passage notably of the gearbox input shaft.

Thus the studs 41 form, with the ring 43, means pivotally fixing the diaphragm 2 to the cover 1. These means are in this case of small size axially, which assists a reduction in the axial size of the hook mounting holes 9 described below.

In this case the head 42, 142, with a rounded end 63, offers a secondary support for the diaphragm 2 opposite the ring 43 forming a primary support. As a variant the ring 43 can be replaced by a pressing formed in the base 11 of the cover.

In general terms the diaphragm is pivotally mounted between the primary support 43 and the secondary support 42, 142.

To do this the stud 41, in addition to its head 42, 142, has a guide portion 90, 190 for guiding and centring the diaphragm, and a foot 50, 150 for connecting the stud 41 to the base 11 of the cover.

The guide portion 90, 190 enters the openings 23 and is suitable for cooperating with the lateral edges 25 of the said opening 23, in this case rectangular in shape overall.

It will be noted that this cooperation makes it possible to centre the diaphragm and to guide it during its tilting movement, as described below.

In addition the front end of this portion 90, 190 serves for the axial locking of the stud 41 by bearing on the base 11.

For information, it should be stated that, when the clutch is engaged—friction linings 72, 71 clamped between the front friction face 32 of the pressure plate 3 and the reaction plate 80—the diaphragm 2 bears through the inner peripheral part of its Belleville washer 21 on the primary support 43, and through the outer periphery of its Belleville washer 21 on the support boss 31 of the pressure plate 3. This boss 31, carried by the rear face 33 of the plate 3, turned towards the base 11, is in this case divided into annular segments.

To disengage the clutch (and therefore to release the linings 72, 71), in a manner known per se, pressure is exerted by pushing by means of a clutch release bearing (not shown) on the inner end of the fingers 22 of the diaphragm 2 in order to cause the latter to pivot.

During this operation the diaphragm bears on the secondary support 63 and the hooks 5 return the pressure plate 3 in the direction of the base 11 of the cover because of the fact that the diaphragm is here gripped elastically between the said hooks 5 and the boss 31.

Here the skirt 12 surrounds the pressure plate 3 with its lugs 34 and the tongues 8 also participate in the return of the plate 3 in the direction of the cover.

This skirt is stepped radially in order to have surfaces 15 at the outer periphery of the cover.

Figure 3:
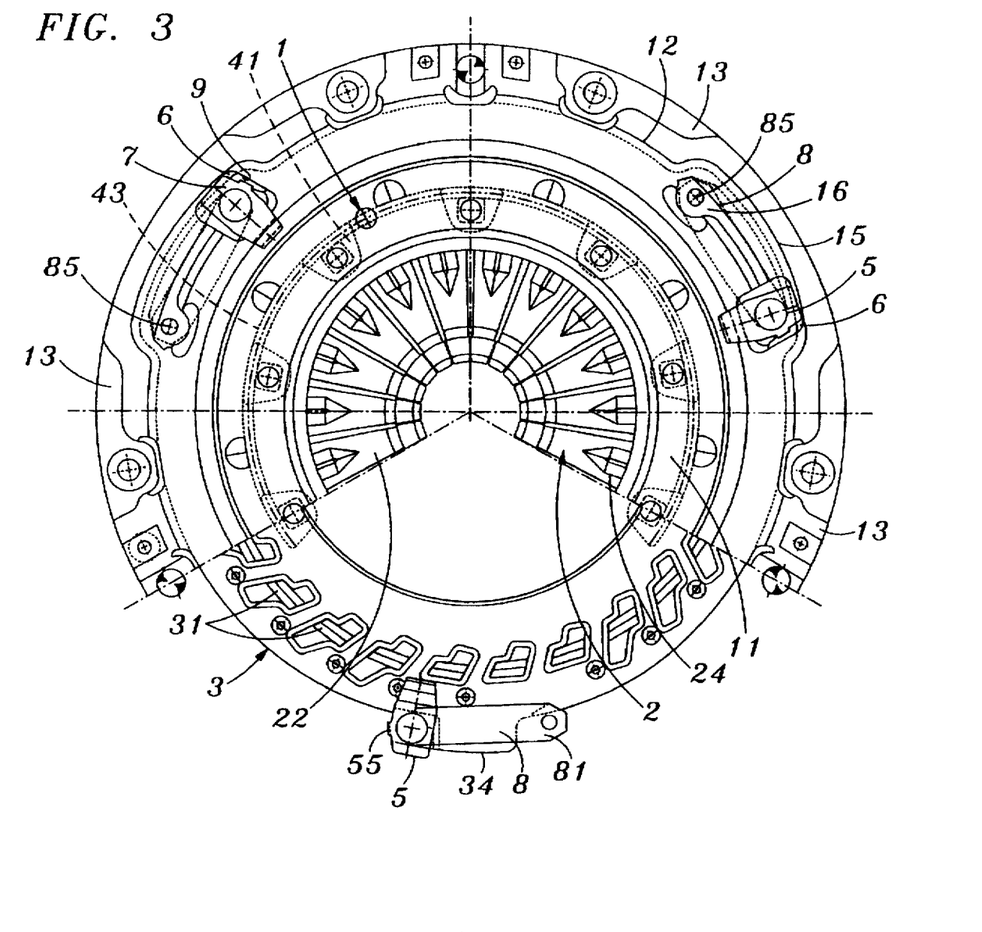
FIG. 3 is a view in the direction of the arrow 3 in FIG. 1 with local cutaway to show the pressure plate.

These surfaces 15, of axial orientation, alternate circumferentially with the fixing surfaces of the flange 13 (FIG. 3). The surfaces 15 surround the lugs 34 of the plate 3. These lugs 34 are extended circumferentially (FIG. 3).

For information, it should be stated that these elastic tongues 8, extending overall tangentially to a circumference of the assembly (FIG. 3), are fixed at one of their ends by the fixing components 35 to the radial lugs 34 of the plate 3 and at their other end by second fixing components 85 to lugs 16 on the cover 11.

These lugs 16 are offset axially with respect to the base 11 of the cover and in the opposite direction to the said base 11. To this end (FIG. 3) these lugs 16 are delimited by the openings affecting the skirt 12.

In this case the tongues 8 are mounted in pairs and the fixing components 35, 85 consist of rivets.

Three sets of pairs of tongues and three hooks are provided, here distributed at 120° with respect to each other.

Naturally this number, like the number of hooks, is not limited and depends on the applications.

For mounting the hooks 5 and fixing components 35, passing through the hooks 5—the tongues 8 and the lugs 34 by means of holes which the parts (FIG. 2) have for this purpose, the cover 1 has mounting holes 9 at the rate of one hole per hook 5, pair of tongues 8 and component 35.

These holes 9 affect the base 11 and the rounded area of connection of the base 11 to its skirt 12. These holes 9 therefore have a front edge 6 furthest away axially with respect to the base 11 of the cover affecting the surfaces 15 of the skirt 12 in this case also provided with ventilation orifices, one of which is visible in the lower part of FIG. 1.

Figure 4:
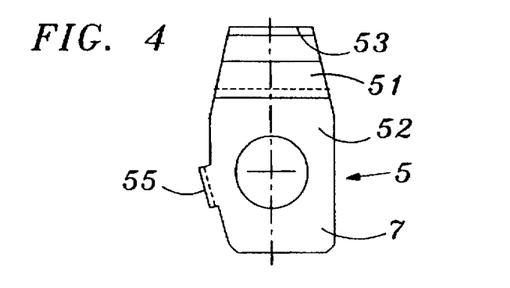
FIG. 4 is a plan view of a hook.

The return hooks 5 have a base plate 52, of transverse orientation, extended radially inwards by a curved part 51 passing round the diaphragm (the outer periphery thereof) in order to offer a support pad 53 opposite the pointed boss 31. The part 51, trapezoidal in shape (FIG. 4), is therefore elastic, which allows gripping, at one point, of the diaphragm between the pad 53 and boss 31. Here the head 36 of the rivets 35 bears on the base plate 52 in order to grip the tongues 8 between the lug 34 and base plate 52. As a variant the components 35 can consist of bolts or pins, whose shaft is forcibly mounted in a blind hole, which the lugs 34 then have.

When the clutch is engaged in the new condition, with new linings 71, 72, the Belleville washer of the diaphragm, tapered in shape in the free state, extends transversely overall.

On the other hand in the free state—also referred to as the storage position—(with the mechanism not mounted on the plate 80), the diaphragm tilts and pushes the plate 3 in the direction opposite to the base 11, that is to say outwards. The tongues 8 then curve.

If no steps are taken in certain cases, the elastic limit of the tongues may be exceeded, notably when the mechanism is dropped (because of the inertia of the reaction plate).

To prevent this, at least one hook 5 is, in this case, extended radially outwards in order to form a stop 7 able to come into abutment against a counter-stop 6 formed by the front edge 6 of the mounting holes 9 which are furthest from the base 11 of the cover.

In this case the counter-stop 6 affects the surface 15 of the skirt 12 as mentioned previously.

Here three surfaces 15 are provided at the rate of one per hook and tongue, whilst being regularly distributed circumferentially.

Naturally this depends on the applications.

It is therefore the base plate 52, which is extended radially outwards to form the stop 7, which engages with circumferential clearance in the hole 9.

The hook 5 has laterally a bent lug 55 formed from its base plate 52 (FIG. 5). This lug is directed axially and is suitable for cooperating with the section of the relevant free end 81 of the tongue 8.

This end 81 has a trapezoidal shape overall.

Thus the hook 5 is immobilised with respect to rotation through cooperation of shapes and there is no risk of its turning.

It will be noted that the lateral position of the lug 55 allows the formation of the stop 7.

As a variant, not shown, the hook can be extended laterally, and it is then allowed to come into abutment against the relevant lateral edge of the hole 9, advantageously the lateral edge closest to the free end of the tongues 8.

This being stated, during the movement of the diaphragm, for example when changing from the clutch engaged position to the clutch disengaged position, a relative movement causing wear occurs between the lateral edges 25 of the openings and the guide portions 90, 190 of the studs 41.

In order to reduce this wear, the invention proposes to cut into the guide portion 90, 190 to form two lateral edges 91, 191 overall in a form of flats designed to cooperate with the lateral edges 25 over the broadened orifices 23 of the diaphragm.

By virtue of this arrangement the contact surface which the studs 41 offer to the lateral edges 25 of the diaphragm 2 is increased, thus bringing about a reduction in wear.

In FIGS. 1 to 9, the fingers 22 are ribbed, the said rib extending into the peripheral part 21 of the diaphragm.

In this case the ribs are produced by machine-pressing the fingers 22 inwards, that is to say in the direction of the plate 3.

Thus the fingers 22 are stiffened and the lifting of the pressure plate is better when the clutch is disengaged. These fingers 22 have a curved shape with an inner part offset axially with respect to their outer part by means of an inclined part.

Figures 10, 11, 12:
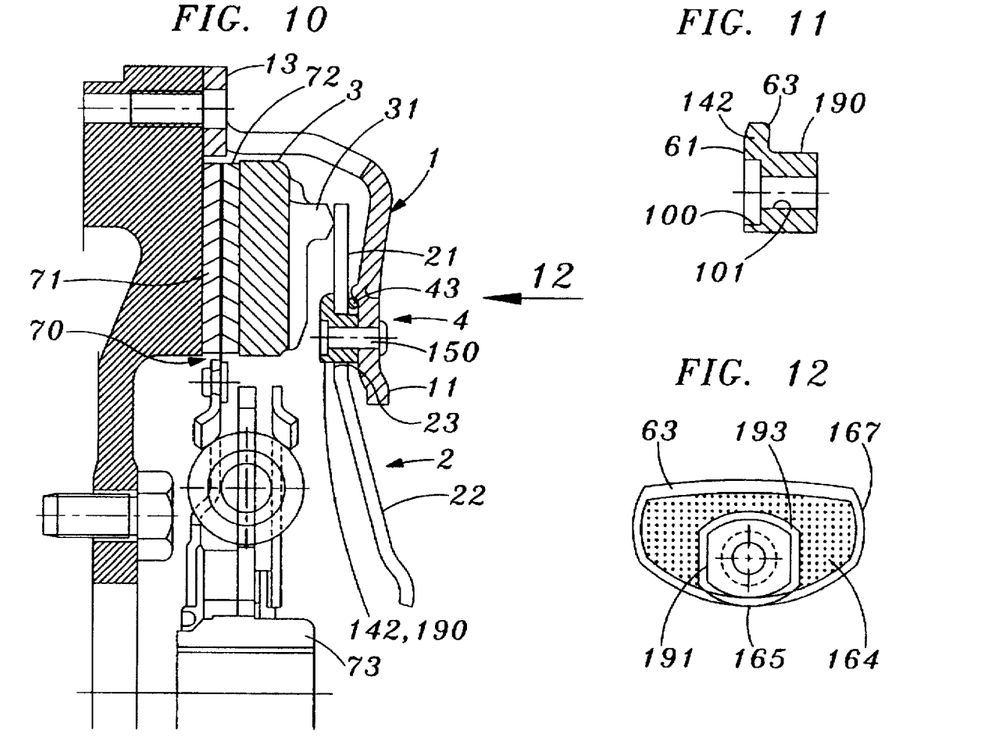
FIG. 10 is a half-view in axial section of a friction clutch equipped with a two-part stud for a third example embodiment.
FIG. 11 is a view in axial section of one of the parts of the stud.
FIG. 12 is a view, in the direction of the arrow 12 in FIG. 10, of this stud.

In FIG. 10, the fingers 22 of the diaphragm are not ribbed and are inclined with respect to the Belleville washer part 21 of the diaphragm. They are curved at their inner end in order to cooperate with the clutch release bearing.

In all cases the openings 23 have a rectangular shape overall with two lateral edges 25 parallel to each other just like the edges 91, 191.

These openings or orifices 23 are therefore passage orifices for the studs 41.

In FIGS. 1 to 9, the studs 41 are made in a single piece, whilst in FIGS. 10 to 12 the studs are in two parts.

Figure 1:
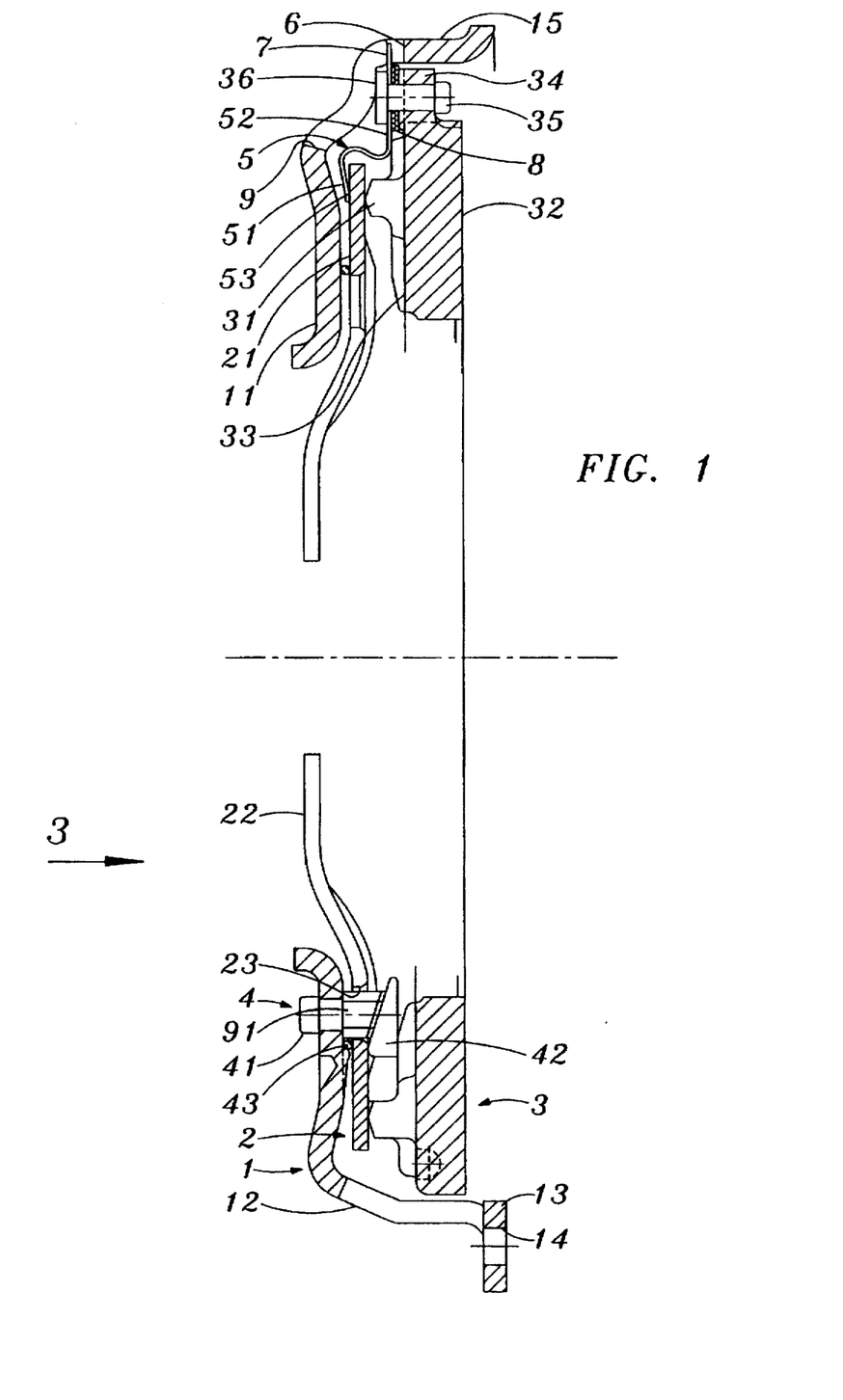
FIG. 1 is a view in axial section of a mechanism according to the invention.

In FIGS. 1 to 9, the studs therefore have a foot 50 adapted to pass through an associated opening provided in the base 11 of the cover (FIG. 1).

The free end of this foot is designed to be broadened out for fixing the stud 41 to the base 11 by riveting.

This foot 50 is here annular in shape but of course, as described in the above-mentioned document FR-A-1 524 350, it can be of rectangular cross section, such as square, for locking of the stud in rotation and location thereof.

The guide portion 90 is larger than the foot 50, whilst being smaller than the head 42. Here the head 42 is larger than the orifice 33.

Thus a shoulder 51 is created at the rear end of the foot 50 by means of the portion 90. The position of the shoulder 51 depends on the thickness of the ring 43. In practice a slight clearance exists between the secondary and primary supports to allow a tilting of the diaphragm between these supports, in a manner known per se.

The head 42 is delimited by a rear back face 61, furthest away from the base 11 of the cover 1. This base 61 extends transversely and therefore perpendicularly to the axial axis of symmetry of the foot 50.

The head 42 is also delimited by a front face 64, a top face 62, 63, a bottom face 65, two lateral edges 67 and by rounded parts 66 connecting the top face 62, 63 to the lateral edges 67.

The front face 64 is tapered in shape, so that the head 42 is wider at its top than at its bottom.

The bottom edge 65 is semi-circular in shape overall, whilst the lateral edges 67 are inclined (FIG. 7) and intersect each other on the transverse axis of symmetry of the stud 41.

Here the stud 41 is produced by forging, so that connecting shoulders 68 exist between the face 64 and the edges 67 and 65.

A connection area 93 exists between the face 64 and the guide portion 90.

The top face 62 is circumferentially slightly arched in shape (FIG. 7) and is connected to the face 64 by a rounded and circumferentially arched area 63 forming the secondary support.

The guide portion has in cross section two lateral edges 91, in the form of flats, connected together by two semi-circular edges 92 because initially the portion 90 is annular in shape, in this case cylindrical, and is cut into for the formation of the two flats 91.

These flats can be very slightly convex, notably when the stud is produced by forging. The edges 91 are therefore parallel to each other overall and it is they which are designed to cooperate with the lateral edges 25 of the openings 23.

This stud 41 in this case undergoes a quench-hardening and annealing operation in order to harden it.

It will be noted that the face 64, in a manner known per se, enables the diaphragm 2 to pivot, the stud 41 being immobilised axially because of the shoulder 51 and the deformation of the foot passing through an associate opening formed in the base 11.

Naturally, as a variant (FIG. 9), the top face 162 can be cut into at the level of its area of connection with the rear face 61.

Figure 9:
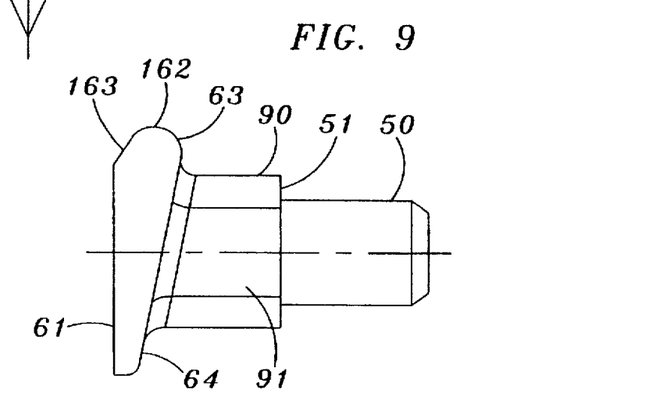
FIG. 9 is a view similar to FIG. 6 for a second example embodiment.

Thus in FIG. 9 a bevel 163 can be seen, connecting the rear face 61 with the top face 162 of the stud 41. This bevel makes it possible to reduce the thickness of the stud at this point, which limits interference with the rear face 33 of the pressure plate and therefore affords a saving in space.

Naturally the free end of the foot 50 can be cut into (FIG. 9) to facilitate riveting.

The stud 41 can be in two parts (FIGS. 10 to 12) and have an unhardened rivet 150 and a hardened single-piece part 142, 190 including the guide (and centring) portion and the support portion for the diaphragm 2 (for the Belleville washer 21 of the latter).

The rivet 150 is suitable for passing through an opening 101 formed in the single-piece part 142, 190.

This part has, at its back face 61, turned towards the plate 3, a recess 100 extending the hole 101, forming the end thereof.

This recess 100 is adapted to the size of the head of the rivet 150.

Thus the head of the rivet 150 is housed in a housing 100 and does not project with respect to the back face 61 of the single-piece part 190, 142.

This single-piece part has a guide part 190 of reduced size with two flats parallel to each other overall, in this case numbered 191, to cooperate with the parallel lateral edges 25 of the openings 23.

This guide part is made in one piece with the head 142 of the stud 41, a connection area 193 existing as before between the said guide portion and the front face 164 of the head 142.

It will be noted that this face 164 is in this case plane, whilst extending transversely and parallel to the rear or back face 61 of the head 142. Naturally the face 164 can be tapered.

Figure 6:
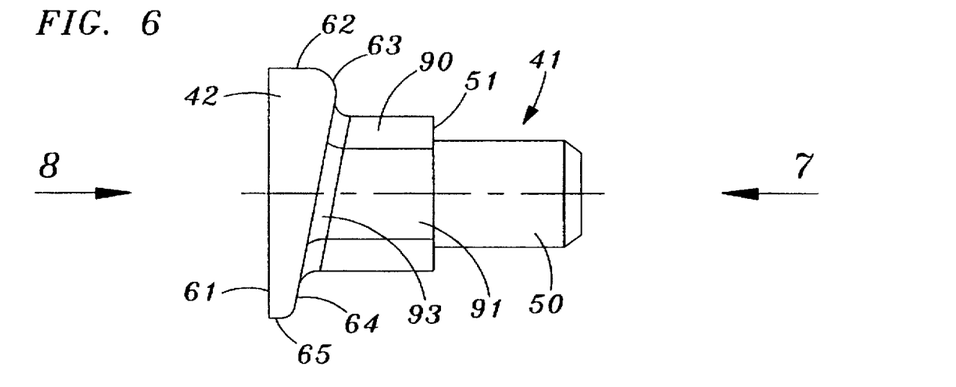
FIG. 6 is a plan view of a stud according to the invention, to a large scale.
Figure 7:
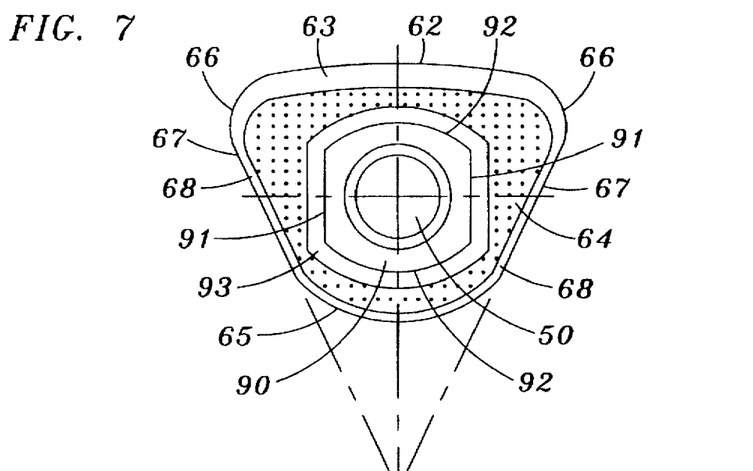
FIG. 7 is a view in the direction of the arrow 7 in FIG. 6.
Figure 8:
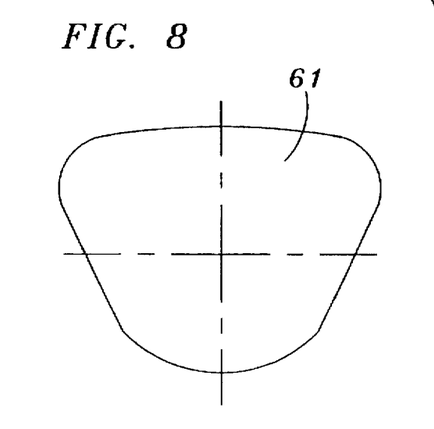
FIG. 8 is a view in the direction of the arrow 8 in FIG. 6.

This head has in its top part a rounded part 63 in the form of a pad as in FIG. 6 for offering secondary support for the diaphragm.

The top face of the head 142 is cut into at the rear as in FIG. 9.

The bottom edge 165 of the head 142 is connected by two rounded areas 167 to the tilting support 63.

It will be noted that this edge 165 is adjacent to the connection area 193 so that the size of the head 142 is reduced in height, in its bottom part.

In this way a saving in space is achieved, enabling a larger friction disc 70 to be housed.

This arrangement is particularly advantageous since the single-piece part 142, 190 can be hardened separately from the rivet 150.

Thus the foot of the rivet 150 can easily be crushed during its crimping, leading to immobilisation of the single-piece part 142, 190 between the base 11 of the cover and the head of the rivet 150, fitted in the housing 100 enabling a shoulder to be created.

By virtue of this arrangement, the diaphragm can be clamped elastically between its primary support 43 and the head 142, the rivet 150 undergoing only tensile loads.

By virtue of the production in two parts it is possible to give any shape to the head 142.

It will be noted that in this case the face 164 can be transverse since the single-piece part enters entirely by its bottom part into the openings 23, its top part 63 projecting radially with respect to the said opening.

Naturally the present invention is not limited to the example embodiment described. In particular the cover can be made of fibre-reinforced plastic.

It is possible to mount the diaphragm 2 outside the cover, as in FIG. 4 of the document FR-A-1 524 350. In this case, the cover is flat and the head of the brace forms the primary support for the diaphragm. In all cases, the studs 41 have a head profiled so as to offer a support to the peripheral part, in the form of a Belleville washer, of the diaphragm 2.

The clutch can include two pressure plates and therefore two friction discs.

The hole 9 can have another shape, this depending on the depth of the cover 1 in this case entirely surrounding the pressure plate 3 and diaphragm 1.

The diaphragm 1 can have fingers with a curved inner end (FIG. 10). These fingers can lie entirely in line with its Belleville washer.

It will be noted that on the one hand the studs 41 with heads 42, 142 and on the other hand the shape of the diaphragm with fingers 22 (FIGS. 1 and 10) assist a reduction in the thickness of the mechanism and therefore in the size, notably the axial size, of the mounting holes.

The presence of return hooks 5 is not required.

We claim:

1. Diaphragm clutch mechanism, having a cover (1), a diaphragm (2) having broadened orifices (23) of rectangular shape with lateral edges and being mounted on the cover by pivoting means (4) pivotally fixing the diaphragm to the cover, a pressure plate (3) fixed to the cover (1) with respect to it by coupling means (8), in which the cover (1) has a base (11) carrying studs (41) belonging to the pivoting means (4), said studs having a foot (50, 150) for fixing the stud (41) to the base (11), an annular guide portion (90, 190) designed to cooperate with the lateral edges (25) of the broadened orifices (23) of rectangular shape, which the diaphragm (2) has for passage of the studs (41), and a head (42, 142) having a rear face (61) and a top part with a top face (62, 162), said head being profiled so as to offer a support to the peripheral part, in the form of a belleville washer (21), which the diaphragm (2) has, wherein said guide portion (90, 190) is cut to form two lateral edges (91, 191) overall in the form of flats designed to cooperate with the lateral edges (25) of the broadened orifices (23) of the diaphragm (2), and said stud (41) is in two parts and has a rivet (150) and a single-piece part (142, 190) including the guide portion (190).

2. Mechanism according to claim 1, characterised in that the guide portion (90, 190) has in cross section two lateral edges (91, 191) parallel to each other overall in the form of flats connected together by two semi-circular edges (92).

3. Mechanism according to claim 1, characterised in that the rivet (150) is suitable for passing through a hole (101) formed in the single-piece part (190, 190).

4. Mechanism according to claim 3, characterised in that the single-piece part (182, 190) has a recess (100) extending the said hole in order to house the head of the rivet (150).

5. Mechanism according to claim 1, characterised in that the single-piece part (182, 190) is hardened and has a support portion for the Belleville washer (21) of the diaphragm (2).

6. Mechanism according to claim 1, characterised in that the head (42, 142) has in its top part a rounded part (63) in the form of a pad for offering a support to the diaphragm (2).

7. A Diaphragm clutch mechanism having a cover (1), a diaphragm (2) having broadened orifices (23) of rectangular shape with lateral edges and being mounted on the cover by pivoting means (4) pivotally fixing the diaphragm to the cover, a pressure plate (3) fixed to the cover (1) with respect to it by coupling means (8), in which the cover (1) has a base (11) carrying studs (41) belonging to the pivoting means (4), said studs having a foot (50, 150) for fixing the stud (41) to the base (11), an annular guide portion (90, 190) designed to cooperate with the lateral edges (25) of broadened orifices (23) of rectangular shape, which the diaphragm (2) has for passage of the studs (41), and a head (42, 142) profiled so as to offer a support to the peripheral part, in the form of a belleville washer (21), which the diaphragm (2) has, wherein said guide portion (90, 190) is cut to form two lateral edges (91, 191) overall in the form of flats designed to cooperate with the lateral edges (25) of the broadened orifices (23) of the diaphragm (2), said head (42, 142) has in its top part a rounded part (63) in the form of a pad for offering a support to the diaphragm (2), the top face (62, 162) of the head (42, 142) of the stud (41) is cut into at its area of connection with the rear face (61) of the said head.

* * * * *